Figure 1:
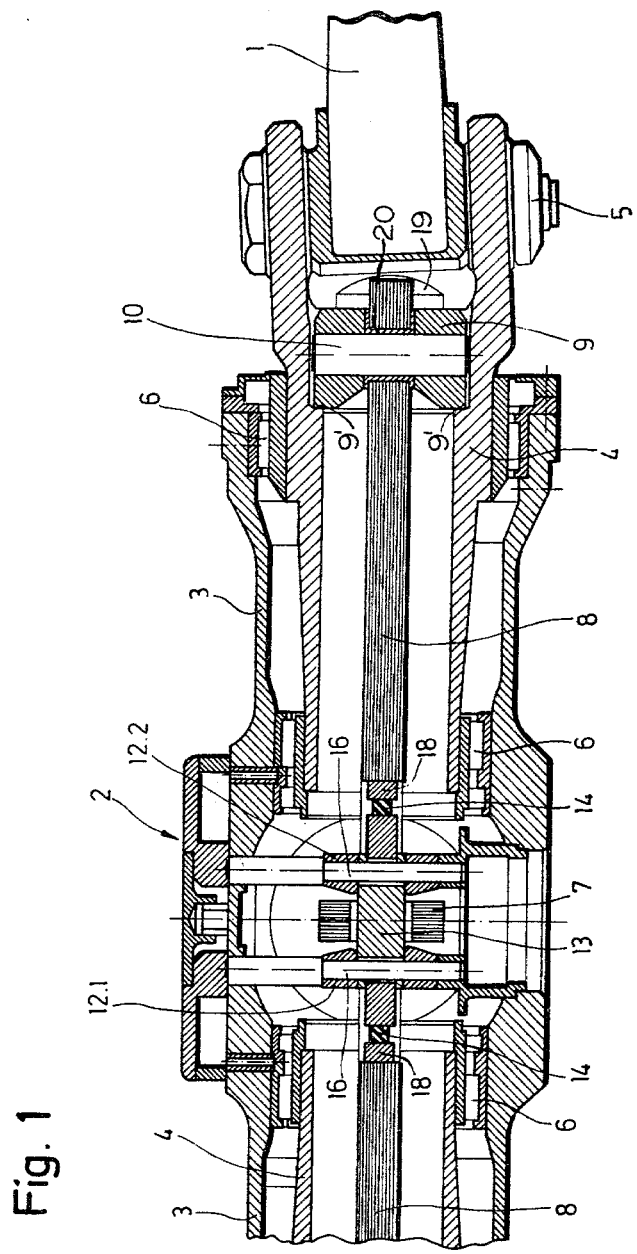

United States Patent [19]

Schwarz et al.

[11] 4,251,188
[45] Feb. 17, 1981

[54] FOUR-BLADE ROTOR, ESPECIALLY FOR HELICOPTERS

[75] Inventors: Alois Schwarz, Putzbrunn; Karlheinz Mautz, Ottobrunn; Michael Stephan, Munich, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 962,304

[22] Filed: Nov. 20, 1978

[30] Foreign Application Priority Data

Dec. 17, 1977 [DE] Fed. Rep. of Germany ....... 2756398

[51] Int. Cl.³ .............................................. B64C 27/48
[52] U.S. Cl. ................................. 416/134 A; 416/138
[58] Field of Search ............... 416/134 A, 138 A, 141, 416/136

[56] References Cited

U.S. PATENT DOCUMENTS

| 3,470,962 | 10/1969 | Cure | 416/141 X |
| 3,578,877 | 5/1971 | Mautz | 416/134 A |
| 4,183,718 | 1/1980 | Mautz et al. | 416/138 X |

Primary Examiner—Everette A. Powell, Jr.
Attorney, Agent, or Firm—W. G. Fasse; D. F. Gould

[57] ABSTRACT

The present four-blade rotor structure comprises two pairs of rotor blades. Diametrically opposite each other located blades form a pair and the blades of a pair are connected to each other by coupling belts which are tension resistant and torsionally yielding. One coupling belt extends substantially horizontally whereas the other extends substantially vertically. The coupling belts are centered in the rotor head by respective centering bodies. The centering bodies are connected to their respective belt by bearing elements capable of taking up pressure loads while simultaneously permitting a blade angle adjustment. In a modification the bearings may be slide bearings.

10 Claims, 2 Drawing Figures

FOUR-BLADE ROTOR, ESPECIALLY FOR HELICOPTERS

BACKGROUND OF THE INVENTION

The present invention relates to a four-blade rotor, especially for helicopters in which the rotor blades are arranged in pairs. The blades of a pair are located diametrically opposite each other and secured to the rotor head for permitting a blade angle adjustment. Between the blade roots of the blades forming a pair, coupling means are located in the form of a belt, for example, which is tension resistant but torsionally yielding. One coupling means such as a belt extends in a vertical plane and the other torsionally yielding coupling extends in a horizontal plane, whereby the latter passes through the vertical, torsionally yielding coupling means.

German Patent No. 1,531,359 describes a rotor of the type just mentioned wherein the torsionally yielding coupling or connection of the respective rotor blade pair passes freely through the rotor head center in such a manner that cyclic blade angle adjustments do not cause any twisting of the torsionally yielding coupling. Thus, the torsion loading of the coupling is substantially determined only by the collective blade angle adjustment. Incidentally, the cyclic blade angle adjustment involves tilting the two rotor blades arranged diametrically opposite each other in the same direction and to the same extent.

However, practical experience has shown that is it not possible to do without a central holding of the rotor blade pair at the rotor head due to unbalances and vibrations in the direction of the rotor blade. Thus, the just described rotor did not attain any practical significance. It is customary to make the torsionally yielding couplings in the form of laminated bundles of fiber reinforced materials. These couplings interconnect a respective rotor blade root with a central body arranged coaxially to the rotational axis of the rotor head as described in German Pat. No. 2,150,741. In this type of arrangement it is not possible to obviate the fact that for each angular movement of the individual rotor blade a twisting of the corresponding laminate bundle takes place which twisting is effective all the way to the central body. The couplings form elongated loops.

OBJECTS OF THE INVENTION

In view of the above it is the aim of the invention to achieve the following objects singly or in combination:

to provide a central anchoring device in the rotor head of a four-blade rotor of the type mentioned above, whereby the rotor blade pairs or rather their torsionally yielding couplings are centrally held in position.

to provide a central holding for the blade coupling means without impairing the free passing of the torsionally yielding couplings to the rotor head center and to maintain the advantage of a reduced torsional loading of the coupling;

to provide a centering for the couplings of diametrically opposed rotor blades which is suitable for any type of couplings including the above mentioned elongated loops, couplings with a centrally cut-out portion and the like;

to center the blade couplings in the rotor head substantially without play, yet without substantially limiting their freedom of motion;

to minimize the structural or rather manufacturing expense without diminishing the operational reliability of such rotor structure;

to provide a compressive load bearing between the centering means and the radially outer ends of the coupling means or a sleeve bearing; and to subject the compressive load take up bearings in such a manner with a biasing pressure load that tension loads to which the torsionally yielding couplings are subjected will not result in any substantial play in the centering.

SUMMARY OF THE INVENTION

According to the invention this four-blade rotor structure comprises for each of the blade root coupling means a separate rigid centering body arranged in the rotor head center. The coupling means are tension resistant and torsionally yielding. In addition, the coupling means comprise at least in the respective center, an aperture. Each torsionally yielding coupling means is connected to its respective centering body on both sides of the rotor head center by means of a compression loadable bearing preferably extending coaxially to the longitudinal blade angle axis. The pressure loadable bearings permit the angular adjustment of the respective blades about the longitudinal blade axis. The arrangement is such, that the horizontally extending, torsionally yielding coupling passes freely through the centering body of the vertically extending, torsionally yielding coupling. Further, the centering body of the horizontal coupling is located in a passage of the horizontal coupling. The centering body of the horizontal coupling also passes through the centering body of the vertical coupling. Both centering bodies are interconnected in a force transmitting manner either by force locking means and/or by form locking means.

According to the invention the construction and arrangement of two centering bodies basically achieves that in combination with two compressively loaded bearings for each torsionally yielding coupling, these couplings may be centered in the rotor head substantially without play. Simultaneously this arrangement makes sure that the freedom of movement for the torsionally yielding coupling is substantially maintained. Preferably, the compressively loaded bearings are made of torsionally yielding elastomeric material. By appropriately biasing or pressure loading the bearings of elastomeric material in the rest position of the rotor, it is possible to exclude that tension loads on the torsionally yielding couplings cause a play in the centering of these couplings as a result of a tension loading of the respective elastomeric bearings.

It is an advantage of the invention that it reduces the structural costs without diminishing the operational reliability of the present rotor structure.

BRIEF FIGURE DESCRIPTION

Figure 2:
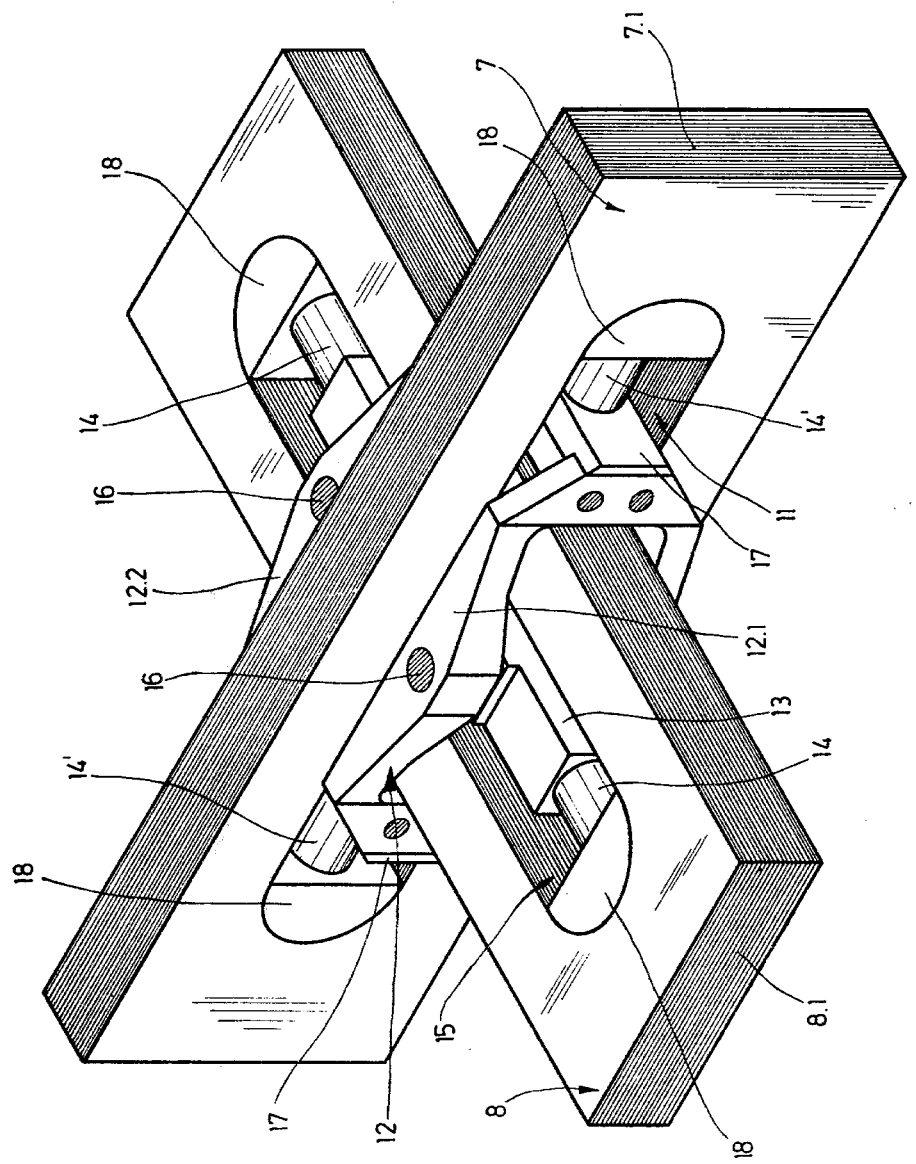

In order that the invention may be clearly understood, it will now be described, by way of example, with reference to the accompanying drawings, wherein:

FIG. 1 shows a sectional view longitudinally through the rotational axis of a rotor structure according to the invention whereby the rotational axis extends vertically and wherein only one of the four rotor arms is shown; and FIG. 2 is a perspective illustration of the two torsionally yielding couplings which operatively interconnect the two pairs of rotor blades in a four-blade rotor, said couplings comprising tapes or belts, wherein the centering means are located in the cross-over area of the two tapes or belts.

DETAILED DESCRIPTION OF A PREFERRED EXAMPLE EMBODIMENT AND OF THE BEST MODE OF THE INVENTION

FIG. 1 shows a four-blade rotor wherein the four blades are arranged in a common plane. Only one rotor blade or rather the root 1 of such a rotor blade is shown in the sectional view of FIG. 1. The rotor blades are, for example, made of fiber reinforced synthetic material as is known in the art. The rotor head 2 comprises a number of rotor arms corresponding to the number of the rotor blades. The rotor head is operatively secured to a rotor shaft not shown. Said rotor arms are constructed in the form of blade angle bearing sleeves 3 in which a respective blade root sleeve 4 is operatively supported by means of roller bearings 6 which permit for a rotational or angular adjustment of the rotor blade 1, the root of which is connected to the blade root sleeve 4 by means of bolts 5 as is conventional. The lead lag bending moments and the flapping bending moments are introduced into the rotor head 2 through the blade root sleeves 4 and through the roller bearings 6 when these moments are effective on the rotor blades 1.

Two rotor blades located diametrically opposite each other are operatively interconnected to form a rotor blade pair in order to take up centrifugal forces to which the rotor blades are subjected. Said connection or coupling interconnects the respective blade roots. These couplings between the blade roots are tension resistant and torsionally yielding for permitting the blade angle adjustment. Each coupling comprises a stretched tape or belt 7 or 8. These tapes or belts 7, 8 may, for example, be manufactured of laminae forming bundles 7.1, 8.1 as shown in FIG. 2. The radially outer ends of these tapes are operatively connected to the respective blade root sleeve 4 by means of a bolt 10 which extends through a so-called "nut" 9 which in turn rests against a shoulder 9' inside the blade root sleeve 4. A protective cup 19 covers the radially outer end of the tapes 7, 8 extending beyond the nut 10. A bushing 20 centers the tape 8 relative to the bolt 10.

In this type of arrangement it is necessary that the two tapes or belts 7, 8 must cross each other in a common plane inside the rotor head center. Therefore, as shown in FIGS. 1 and 2 one tape 7 is arranged in a vertical plane and the other tape 8 is arranged in a horizontal plane. Each tape is provided with a central longitudinal aperture 11 in tape 7 and 15 in tape 8. The horizontal tape 8 extends through the aperture 11 in the vertical tape 7 and also through a centering body 12 for the vertical tape 7. The length and width of the aperture 11 is selected to provide a sufficient clearance between the tapes 7 and 8 so that these tapes do not interfere with each other in their motions when the respective blades are angularly adjusted either collectively or cyclically.

The individual sheets or lamella 7.1 and 8.1 of the tapes 7 and 8 may be made of any suitable elastic materials having a sufficient fatigue alternating load strength. Thus, in addition to the normally used spring steel it is possible to also use fiber reinforced synthetic materials.

According to the invention the two tapes 7 and 8 are centrally held in the rotor head in order to counteract any possible unbalances or vibrations. The centering of the tapes 7 and 8 is accomplished in such a manner that their freedom of motion is practically unimpaired, whereby the advantage of a torsion loading of the tapes exclusively by static twisting of the rotor blades 1 is maintained when the latter are subject to a steering action. For this purpose a stiff centering body 12 or 13 is provided for each tape 7 and 8 separately as shown in FIGS. 1 and 2. The centering bodies 12, 13 are arranged in the rotor head center. Each tape is connected to its respective centering body through a compressively loadable bearing 14 made of elastomeric material and preferably arranged coaxially relative to the longitudinal blade axis. In order to assure the free passing of the tapes 7 and 8 through the rotor head center the centering body 13 for the horizontally extending tape 8 is located in the passage or longitudinal aperture 15 of the horizontal tape 8. Hence, the centering body 13 extends substantially in the plane defined by the tape. The tape 8 in turn extends through the vertically arranged tape 7 and through the centering body 12 of the tape 7, whereby the centering body 12 also extends through the aperture or passage 11 in the vertical tape 7.

The centering body 12 preferably comprises two sections, which may be half sections 12.1 and 12.2 having two legs extending substantially in parallel to the outer side surfaces of the tape 7. This type of centering body construction and arrangement has the further advantage that two bolts 16 provide a force locking and form locking connection between the two centering bodies 12 and 13 as shown in FIG. 2 and simultaneously a connection to the rotor head 2 as shown in FIG. 1. Further, as shown in FIG. 2, one centering body 13 may function with its facing ends as sockets for the two corresponding elastomeric bearings 14. The same socket function is accomplished for the elastomeric bearings 14' cooperating with the centering body 12, by means of spacer members 17 arranged to bridge the two half sections 12.1 and 12.2 of the centering body 12.

The radially outer ends adjacent to the apertures or longitudinal slots 11, 15 of the tapes 7 and 8 are connected to the respective elastomericbearings 14, 14' by means of form pieces 18 inserted into the ends of the respective aperture 11, 15. The connection of the elastomeric bearings 14 to the sockets and to the spacer pieces 17 as well as to the form pieces 18 may be accomplished by an adhesive bonding vulcanization, for example, it is a suitable adhesive for the present purposes. The elastomeric bearings 14 may be made, for example, of alternating layers of rubber and metal or the like extending in the axial direction. The axial direction is determined by the longitudinal axes of the respective rotor blades.

Instead of the tapes or belts 7, 8 it is possible to use elongated loops of the type described in the above mentioned German Patent No. 1,531,359 which also forms torsionally yielding couplings of the rotor blades forming a pair. Where the coupling means are torsionally yielding, tension resistant loops, the support means 18 would be arranged in the form of lands between the legs or runs or the individual loops.

The described central anchoring or holding of the coupling tapes or belts 7, 8 causes a loading of the elastomeric bearings 14 in the direction of the longitudinal rotor blade axis as a result of unbalances. Thus, these bearings are subjected to a pressure loading, whereby a substantially perfect centering of the respective tapes 7 or 8 is assured substantially without play due to the large spring stiffness of the elastomeric bearings 14, 14' in the axial direction. Such spring stiffness may be determined by the construction of the elastomeric bearings. A tension loading of the elastomeric bearings 14, 14' due to stretching of the tapes or belts 7, 8, may be avoided by installing the elastomeric bearings under a pressure biasing. As a result of such pressure biasing the elastomeric bearings 14, 14' are substantially load free during the operation of the rotor as long as unbalances and vibrations in the direction of the rotor blade axis do not occur.

Incidentally, the above described centering by means of the elastomeric bearings may also be accomplished by axially effective slide bearings.

Although the invention has been described with reference to specific example embodiments, it will be appreciated, that it is intended, to cover all modifications and equivalents within the scope of the appended claims.

What is claimed is:

1. A four-blade rotor structure, especially for helicopters, comprising a rotor head means (2) having a center, four rotor blades including respective blade root means arranged in pairs, whereby the blades of a pair are located diametrically opposite each other, blade angle bearing means (6) for operatively connecting the blade root means (4) to said rotor head means (2), first vertical (7) and second horizontal (8) tension resistant and torsionally yielding coupling means (7, 8) operatively interconnecting the blade roots of a respective pair of blades, a longitudinal aperture located centrally in each coupling means, first torsionally stiff centering means (12) for said vertical coupling means (7) located in the respective longitudinal aperture (11), second torsionally stiff centering means (13) for said horizontal coupling means (8) located in the respective longitudinal aperture (15), a first pair of pressure take-up bearing means (14') operatively interconnecting the respective centering means (12) and the first, vertical coupling means (7) on both sides of said rotor head center, a second pair of pressure take-up bearing means (14) operatively interconnecting the second centering means (13) and the second horizontal coupling means (8) also on both sides of said rotor head center, said first and second bearing means (14, 14') being torsionally yielding for the blade angle adjustment, one of said centering means (12) having a passage through which the other centering means (13) with the respective other coupling means extend, and means (16) operatively interconnecting said first and second centering means in a force transmitting manner.

2. The rotor structure of claim 1, wherein said first and second coupling means comprise respective tension resistant, torsionally yielding tape or belt means, said first and second centering means comprising respective rigid bodies arranged in the respective longitudinal aperture for cooperation with each other in centering said coupling means without substantially impairing the freedom of movement of the coupling means.

3. The rotor structure of claim 2, wherein said passage is provided in the first centering means for the vertical coupling means whereby the horizontal coupling means (8) extends freely movable through the centering means (12) for the vertical coupling means (7).

4. The rotor structure of claim 1, wherein each of said pressure take-up bearing means comprises a torsionally yielding bearing body of elastomeric material.

5. The rotor structure of claim 4, wherein said bearing means are positioned between the respective centering means and the respective coupling means under a compression biasing force.

6. The rotor structure of claim 1, wherein said first centering means (12) for said vertical coupling means comprise two sections (12.1, 12.2) having legs extending along both sides of the vertical coupling means (7), and wherein said interconnecting means (16) secure both centering means to said rotor head means (2), whereby said centering means are substantially immovable.

7. The rotor structure of claim 6, further comprising bridging means (17), said sections of the first centering means (12) having facing ends operatively connected by said bridging means at both facing ends, said bridging means (17) forming socket means for the respective bearing means (14').

8. The rotor structure of claim 1, wherein said second centering means (13) comprises axial extensions forming socket means for the respective bearing means (14).

9. The rotor structure of claim 1, further comprising support means (18) located in said first and second coupling means substantially at the respective radially outer ends of the corresponding longitudinal aperture for supporting the respective end of the corresponding bearing means.

10. The rotor structure of claim 1, wherein said first and second bearing means extend substantially in axial alignment to the respective longitudinal axis of the corresponding rotor blades.

* * * * *